United States Patent [19]

Dewaele

[11] Patent Number: 4,817,678
[45] Date of Patent: Apr. 4, 1989

[54] BROKEN WARP THREAD LOCATOR

[75] Inventor: Stefan Dewaele, Kortrijk, Belgium

[73] Assignee: Picanol N.V., Belgium

[21] Appl. No.: 62,611

[22] Filed: Jun. 16, 1987

[30] Foreign Application Priority Data

Jun. 20, 1986 [BE] Belgium .............................. 2/60999

[51] Int. Cl.⁴ ............................................ D03D 51/30
[52] U.S. Cl. ...................................... 139/353; 28/187; 66/163; 324/525; 340/677
[58] Field of Search ................ 340/524, 677; 139/353; 28/187; 66/163; 200/61.18; 324/525, 526

[56] References Cited

U.S. PATENT DOCUMENTS

| 4,372,346 | 2/1983 | Hutter | 139/353 |
| 4,399,402 | 8/1983 | Pellietier | 324/525 |
| 4,522,236 | 6/1985 | Lohr | 139/353 |

FOREIGN PATENT DOCUMENTS

| 60-81355 | 5/1985 | Japan . | |
| 61-75848 | 4/1986 | Japan | 139/353 |
| 968118 | 10/1982 | U.S.S.R. | 139/353 |
| 2048319 | 7/1983 | United Kingdom . | |

Primary Examiner—John Chapman
Attorney, Agent, or Firm—Bacon & Thomas

[57] ABSTRACT

The location of a warp thread break in a weaving loom using electrically conductive drop wires bridging an electrode pair upon occurrence of a warp thread break includes applying opposing known voltages across opposite ends of the electrode pair, establishing current circuits including the voltage sources, the electrode pair and a fallen drop wire, and determining the distance between one end of the electrode pair and the fallen drop wire by calculations using known values corresponding with the voltages and measurements of values corresponding to the current values in the current circuits. A system for carrying out the method includes electrode pairs having a detectible resistance, conductive drop wires, voltage sources connected to the electrode pairs, current detecting/measuring devices, computerized calculating system, warp break location indicators and connecting circuit elements.

11 Claims, 2 Drawing Sheets

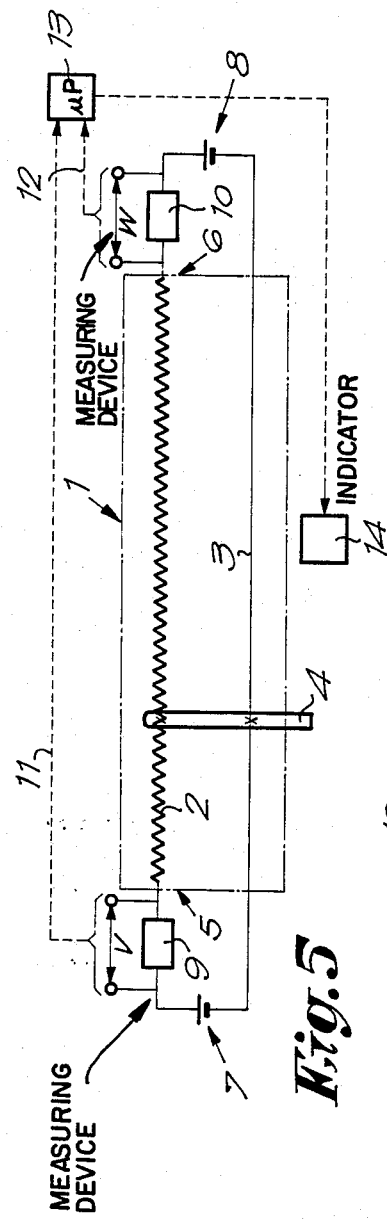
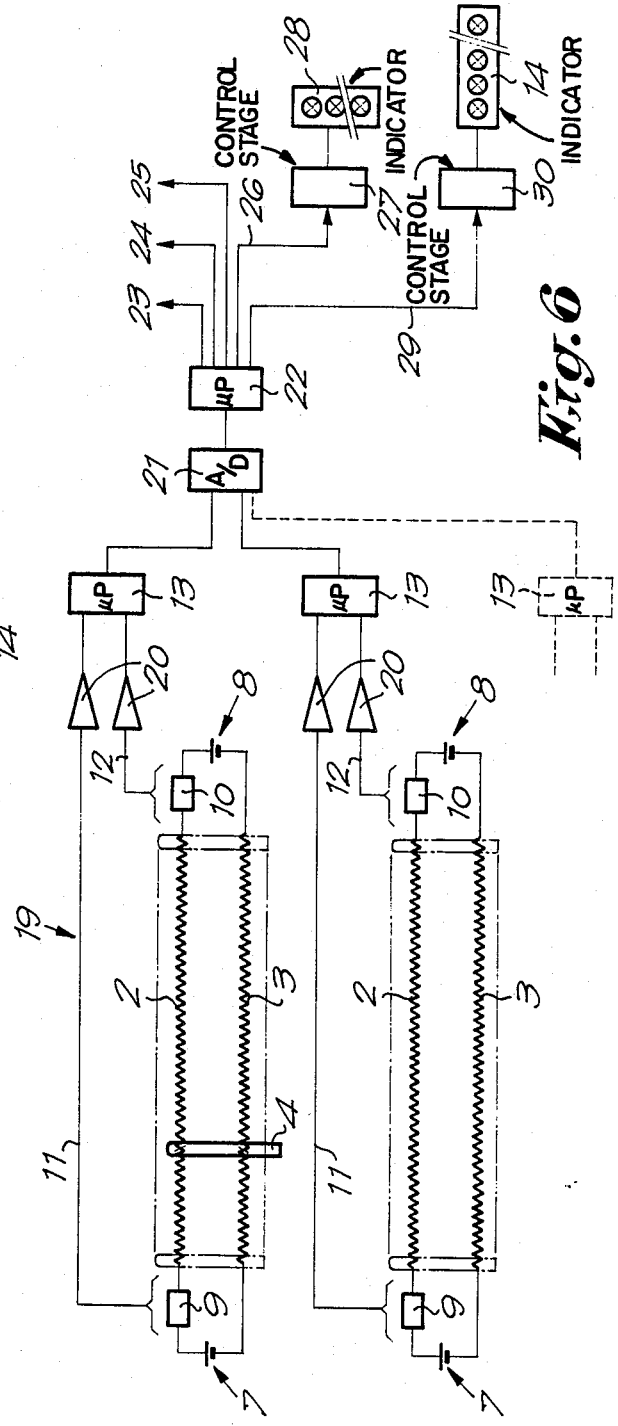

BROKEN WARP THREAD LOCATOR

FIELD OF THE INVENTION

The present invention relates to a method and system for determining the location of a warp thread break in weaving looms, utilizing an electrical warp detector system that includes multiple conductive drop wires suspended on the warp threads, whereby, in the event of a warp break, the corresponding drop wire falls and makes electrical contact across a pair of electrodes, resulting in the establishment of an electrical circuit between the fallen drop wire and the electrodes. As the aforesaid drop wires are arranged in a large and compact package, it is very difficult for the weaver to locate a fallen drop wire. The present invention is concerned with a process and system from determining in a reliable way the location or locations of fallen drop wires and the respective broken warp threads.

DISCUSSION OF RELATED ART

It is known that electro-mechanical devices can be used to locate fallen drop wires, for instance, a carriage running under the drop wire package which detects a fallen wire. Such devices have, however, the disadvantage that they comprise many moving parts, they are bulky, and very sensitive to wear and mechanical problems. Moreover, they are relatively expensive.

According to the Japanese Patent No. 60-81355, the use of a potentiometer principle is also known for determining the location of a fallen drop wire. In this example, one of the electrodes is designed as a resistor and a fallen drop wire and the other electrode function as a middle tap of a potentiometer. Consequently, upon application of a predetermined known voltage to the electrode that acts as the resistor, a partial voltage is measured between one end of this latter electrode and the fallen drop wire. This partial voltage thereby provides a measurement of the distance between the drop wire and the one end of the electrode. However, this system has the disadvantage that, if the contacts between the fallen drop wire and the electrodes are dirty, for instance due to dust particles, or if the wire falls the wrong way, the resultant measurement of the partial voltage and also the location signal become unreliable.

If dust is accumulated between the aforesaid contacts in the electrical drop wire system or if the drop wire falls the wrong way, contact resistance can occur, which can strongly vary and which can be of the same order of magnitude as the internal resistance of the measurement device used for determining the partial voltage, thereby resulting in measurement values that vary on the order of 50% or more.

SUMMARY OF THE INVENTION

The present invention contemplates a method for determining the location of a warp break in automated weaving looms, whereby the aforesaid disadvantages and other disadvantages are systematically avoided and in particular the influence of varying contact resistance in the system. According to this invention, use is made of a warp detector per se that is conventional; i.e, a contact element comprising two essentially parallel electrodes having a detectable resistance and a plurality of drop wires that can locally bridge the electrodes when they fall. In accordance with the invention, at least one of the aforesaid electrodes has an electrical resistance which is not negligible (i.e, which can be detected). The method of the invention is therefore characterized by the fact that it mainly comprises the application of a voltage between the aforesaid electrodes at each end of the contact element, whereby electrical circuits are established on both sides of a fallen drop wire or wires; the direct or indirect determination of the values of the current in the aforesaid circuits and/or of the values which are proportional to them; and the determination of the location of the fallen drop wire or wires by performing calculations using the known voltage and the detected current values.

The present invention is also concerned with a circuit and apparatus (i.e, a system) for carrying out the aforesaid process. The system will be described in more detail herebelow with reference to the figures of drawings appended hereto.

DESCRIPTION OF THE DRAWINGS

In order to enable a better understanding of the characteristics of the invention, a few preferred embodiments are described herebelow with reference to the figures appended hereto, wherein:

FIG. 5 shows an alternative embodiment of the system according to FIG. 2; and

FIG. 6 still another embodiment of the invention.

DETAILED DESCRIPTION OF PREFERRED EMBODIMENTS OF THE INVENTION

Figure 1:
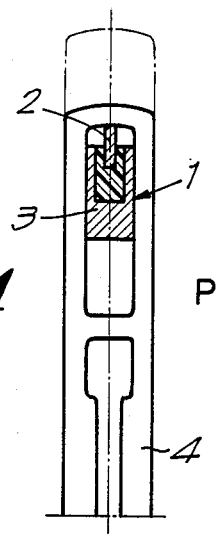
FIG. 1 is a cross-section view of a conventional warp detector contact element including a fallen drop wire.

FIG. 1 illustrates a conventional warp detector that is composed, as already known, of a contact element 1 which mainly comprises a pair of electrodes 2 and 3 electrically insulated from each other and a conductive drop wire 4 that is in fallen condition as a result of a warp thread break or other cause due to a warp defect. As illustrated in FIG. 1, the wire establishes an electrical connection between the electrodes 2 and 3. The method and the circuit system in accordance with this invention makes use of this type of warp detector, whereby, at least one of the electrodes 2 and 3 has a non-negligible resistance, whereby a location determination of the fallen wire can be carried out. Preferably, the electrode resistance is on the order between 5000 Ohm/m and 1 Mega-Ohm/m. This value is approximately equal to 1/10th of the normal contact resistance between a drop wire and the electrodes.

Figure 2:
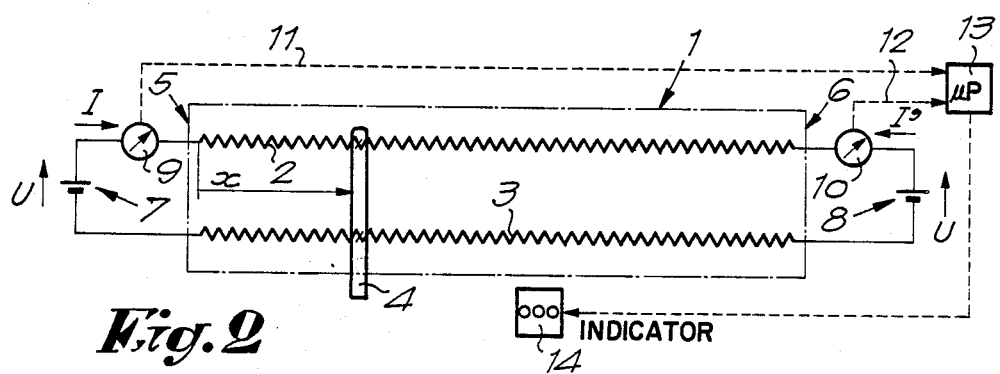
FIG. 2 is a schematic view of a measuring circuit in accordance with the invention.

The system shown in FIG. 2 exemplifies the method and system embodying the present invention. In this example, a contact element 1 comprises two electrodes (electrode pair) 2 and 3 having a detectable resistance and which are electrically connected at a location where a wire 4 falls in the event of a broken warp thread or other warp defect. According to this system, known opposing voltages U that preferably have the same value are applied at opposed ends 5 and 6 of the contact element 1, for instance, by means of voltage sources 7 and 8. At each end 5 and 6 of the contact element 1, a measurement device, respectively 9 and 10 is connected in series with one of the electrodes 2 or 3, in such a way that each measurement device supplies an output signal that is proportional to the electrical currents I and I' occurring at the respective ends 5 and 6 of the contact element 1 and the electrodes 2 and 3. In the most simple embodiment these measurement devices 9 and 10 comprise ammeters. Preferably, however, the output of measurement devices 9 and 10 is supplied through lines 11 and 12 to a computing and control unit 13. This unit 13 in turn provides a signal to an indicator 14 or the equivalent.

Figure 3:
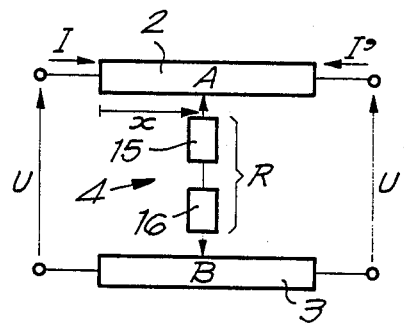
FIGS. 3 and 4 illustrate schematically electrical equivalents of the circuit according to FIG. 2.
Figure 4:
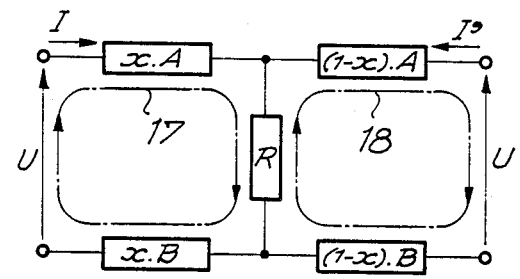

The actual functioning of the aforesaid circuit will be clearly understood by looking at the electrically equivalent circuits of FIGS. 3 and 4. In this case, the resistors having values A and B corresponds to the electrodes 2 and 3 while the R value resistor corresponds to the combined resistance of the contact resistance 15 and 16 occurring between the wire 4 and the electrodes 2 and 3, respectively.

If the total length of the electrodes 2 and 3 is equated to unity or 1, and if x is the distance from the left side of the electrodes to the tap point at the drop wire 4, the diagram of FIG. 4 can easily be equated with the diagram of FIG. 3. Quite obviously, if a drop wire 4 is fallen, two current circuits respectively 17 and 18, are created. The balance equations for these circuits can be expressed as follows:

$$U = (A+B)x \cdot I + (I+I')R \qquad (1)$$

and $$U = (A+B)(1-x)I' + (I+I')R \qquad (2)$$

where:
U = Voltage across resistors A and B;
A and B Resistance values corresponding to electrodes 2 and 3;
x = distance from the left side of the electrodes to the drop wire (fallen);
I and I' current values in circuits 17, 18, respectively; and
R = total resistance between the fallen drop wire and the electrodes 2, 3.

By comparing these two formulas 1 and 2, we get the following result:

$$x = I'/(I+I') \qquad (3)$$

This relationship clearly indicates that the inventive system and method offers the advantage that the distance x can be determined solely as a ratio between currents I, I' and that the R (Resistance) value is not at all important. Thus total contact resistance R may have any arbitrary value without influencing the distance measurement, i.e, the location of the fallen wire.

The aforesaid calculations for determining x are readily carried out in the computing and control unit 13 using simple algorithms. There are a large number of electronic devices able to carry out this task. The calculated result can be outputted as a control signal supplied to the indicator 14. This indicator 14 may have any number of configurations. According to a first embodiment, it may be constituted of a row of signal lamps or LED's mounted along the warp detector, whereby a signal lamp located in the area of the fallen drop wire can be lit in response to the control signal.

According to another embodiment, the indicator 14 may be constituted of a display where the aforesaid value x or a value proportional to x is indicated. A distance scale reproduced near the warp detector can easily indicate the location of the drop wire in response to the control signal.

Clearly, the direct utilization of the I and I' values is usually impossible. FIG. 5 thus illustrates still another embodiment, whereby the measurement devices 9 and 10 are mainly composed of reference resistors, whereby the voltages V and W can be measured against this resistance and the result supplied to the computing and control unit 13. Quite obviously, the values of the currents I and I' can be readily determined from the V and W values. The location of the fallen drop wire can be then calculated in the same way described above in formula 3.

FIG. 5 also clearly indicates that it is quite sufficient that one electrode, in the present case the electrode 2, be made of a material having an appropriate electrical resistance. It should be remarked in this respect that the term "electrical resistance" has only a relative meaning. If the measurement devices are sufficiently accurate and if the connections are also sufficiently accurate, the invention can indeed be put into practice with warp detectors comprising conventional electrodes made of copper, steel or similar materials, whereby the resistance values A and B could be very low.

According to an alternative solution which is not illustrated in the figures, the voltages U can be borrowed from a common voltage source. Moreover, the voltages U may be either alternating current voltages or direct current voltages.

FIG. 6 schematically illustrates a practical system embodiment, whereby the warp detector device 19 is made of several rows of drop wires 4 and corresponding electrodes, 2, 3. The signals of the measurement devices 9 and 10 are supplied through amplifiers 20 to the computing and control units 13, the output control signals of which are sent through an analogue-digital convertor 21 into a micro-processor 22. This micro-processor 22 can, for example, through the outputs 23, 24, 25, stop the weaving, actuate an automatic repair unit, supply information to a central computer located in a weaving room, etc. An indicator 28 can be actuated through an output 26 and a control stage 27 in order to indicate in which row the fallen slat is located. Through an output 29 and a control stage 30, an indicator 14 can be actuated as already described in order to indicate the distance x at which the fallen slat 4 is located.

According to an alternative embodiment illustrated in FIG. 6, one indicator 14 is contemplated for each wire row. This design makes possible, in the case that several wires have nearly simultaneously fallen on different electrodes, to determine their respective locations.

For example, if several wires have fallen on the same electrode, the devices described hereabove indicate a fallen wire. However, the indicated distance will be actually a location between the fallen wires. Taking into account the fact the wires do not usually simultaneously fall, the value x can be accurately determined in the following way. At the moment that the first wire falls, a first measurement of x is carried out. Then, the measurement is repeated at appropriate time intervals. If the same result is always indicated, it means that only one wire has fallen. If the result changes, this indicates that two or several wires have fallen. From the first measurement result, it is possible to determine the location of the first fallen wire as already described, while from the second measurement combined with the first measurement, it is possible to determine the location of the second wire by using the formulas based on electrical theory, similar to formulas (1), (2) and (3) above.

This method can be put into practice further in a simple way for several wires. The different computed results can be supplied in an adequate way to an indicator 14 in order to accurately indicate all locations where a warp break occurred.

The present invention is by no means limited to the designs described by way of examples and illustrated in the figures, but the method and the apparatus of the present invention can be put into practice using any system within the scope of the appended claims without departing from the scope of the invention.

I claim:

1. A method for determining the location of a fallen drop wire in an automated weaving loom using an electrical drop wire weft break detection system wherein multiple conductive drop wires arranged in rows engage weft threads and, upon a weft breakage, fall to bridge a pair of spaced electrodes having a combined resistance (A+B) along their lengths to establish a point of electrical connection between the electrodes at some distance (x) from one end of the electrode pair, said electrical connection having a contact resistance (R), comprising:

(a) applying known voltages (U) in opposition to each other across the opposed ends of the electrode pairs to thereby establish a pair of current circuits respectively including (i) the lengths (x) of the electrodes from one electrode pair end to the fallen drop wire, and the conductive drop wire; and (ii) the remaining lengths of the electrode pair from the fallen drop wire to the opposite end of the electrode pair, and the fallen drop wire; whereby, the relationships thus established can be expressed as:

$$U = (A+B)x \cdot I + (I+I')R \qquad (1)$$

and $$U = (A+B)(1-x)I' + (I+I')R \qquad (2)$$

where:
   I and I' are values corresponding to current flowing through the pair of current circuits; and the total length of the electrode pair is equated to unity (1);

(b) determining values corresponding with the currents I and I';
   (c) determining the value x from the expression:

$$x = I'/(I+I') \qquad (3)$$

to determine the location of the fallen drop wire.

2. The method as claimed in claim 1, including the step of repeating the steps (b) and (c), and determining if a plurality of values of x result, thereby indicating whether a plurality of drop wires have fallen sequentially.

3. The method as claimed in claim 1, wherein in step (b), the relative values corresponding to currents I and I' are determined by determining ratios of values corresponding with I and I' to I+I'.

4. The method as claimed in claim 1, wherein in step (b) the relative values corresponding to currents I and I' are determined indirectly by respectively determining the values of voltages (V) and (W) across known reference resistors in series with the circuits carrying currents I and I'.

5. The method as claimed in claim 1 including providing a visual indication of the value of x related to the location of the fallen drop wire in the loom.

6. In a weaving machine including an electrical warp break detection system including multiple conductive drop wires disposed in rows and with each wire arranged to conductively bridge an electrode pair having a combined resistance (A+B) along its length upon the breakage of a warp thread to instigate a warp defect signal, the improvement comprising:

a pair of voltage sources providing voltages (U) connected in opposition to each end of the electrode pair;
   means for detecting relative values corresponding to currents (I, I') flowing through a pair of current circuits including each voltage source, the length of the electrodes of the electrode pair between the voltage sources and a drop wire instigating a warp defect signal, and the signal instigating drop wire bridging the electrode pair at some distance (x) from one end of the electrode pair corresponding with a fraction of the total length of the electrode pair; and
   means for computing at least the lengths of the electrode pair from one end of said electrode pair to the signal instigating drop wire using the values of I and I' in accordance with the expression:

$$x = I/I + I') \qquad (3)$$

and
   means for generating a signal indicative of the value of x.

7. The improvement in a weaving machine as claimed in claim 6, wherein the value of the resistance (R) between the signal instigating drop wire and the electrode pair R is within the range of approximately 5,000 to $1 \times 10^6$ ohms per meter.

8. The improvement in a weaving machine as claimed in claim 6, wherein the ratio of the resistance (R) between a signal instigating drop wire and the electrode pair and the resistance (A+B) of the combined length of the electrode pair is 10 to 1.

9. The improvement in a weaving machine as claimed in claim 6 wherein the means for detecting relative values corresponding to current I and I' comprise resistor means having a known resistance in series with each current circuit, means for determining the voltage drop (V and W) across said resistor means, and means for calculating said relative values corresponding to values of said currents I and I' from the values of U, V, W, A, B and R (the resistance at the connection between the signal instigating drop wire and the electrode pair).

10. The improvement in a weaving machine as claimed in claim 6 including means responsive to said signal indicative of the value of x comprising a visible signal indicator displaying information corresponding to the value of x.

11. The improvement in a weaving machine as claimed in claim 6 including visible signal means responsive to said signal indicative of the value of x, said visible signal means being disposed proximate the signal instigating drop wire.

* * * * *

UNITED STATES PATENT AND TRADEMARK OFFICE
CERTIFICATE OF CORRECTION

PATENT NO. : 4,817,678

DATED : April 4, 1989

INVENTOR(S) : Dewaele

It is certified that error appears in the above-identified patent and that said Letters Patent is hereby corrected as shown below:

The list of References Cited on the first page of the Patent should be amended to include the following citation: -- 1133757 11/1968 United Kingdom. --.

Signed and Sealed this

Tenth Day of October, 1989

Attest:

DONALD J. QUIGG

*Attesting Officer*  *Commissioner of Patents and Trademarks*